United States Patent
Feller

(10) Patent No.: US 8,047,570 B2
(45) Date of Patent: Nov. 1, 2011

(54) AIRBAG ARRANGEMENT FOR A VEHICLE OCCUPANT RESTRAINT SYSTEM AND A METHOD FOR THE PRODUCTION OF AN AIRBAG MODULE

(75) Inventor: Jens Feller, Illerkirchberg (DE)

(73) Assignee: Takata-Petri AG, Aschaffenburg (DE)

( * ) Notice: Subject to any disclaimer, the term of this patent is extended or adjusted under 35 U.S.C. 154(b) by 0 days.

(21) Appl. No.: 12/588,489

(22) Filed: Oct. 16, 2009

(65) Prior Publication Data

US 2010/0038889 A1 Feb. 18, 2010

Related U.S. Application Data

(63) Continuation of application No. PCT/EP2008/054799, filed on Apr. 21, 2008.

(30) Foreign Application Priority Data

Apr. 19, 2007 (DE) .................. 20 2007 006 023 U

(51) Int. Cl.
*B60R 21/20* (2006.01)
(52) U.S. Cl. .............. 280/743.1; 280/736; 280/739; 280/730.2; 280/728.2
(58) Field of Classification Search ............ 280/730.2, 280/743.1, 739, 736, 728.2; *B60R 21/20*
See application file for complete search history.

(56) References Cited

U.S. PATENT DOCUMENTS

| 4,805,930 | A | 2/1989 | Takada |
|---|---|---|---|
| 5,931,497 | A | 8/1999 | Fischer |
| 6,056,318 | A | 5/2000 | Braunschadel |
| 6,139,048 | A | 10/2000 | Braunschadel |
| 6,561,538 | B2 | 5/2003 | Ford et al. |
| 7,226,077 | B2 * | 6/2007 | Abe .......................... 280/736 |
| 7,243,948 | B2 | 7/2007 | Aranzulla et al. |
| 2007/0096439 | A1 * | 5/2007 | Kashiwagi ............ 280/728.2 |
| 2007/0278769 | A1 | 12/2007 | Glaab |
| 2008/0088118 | A1 * | 4/2008 | Wipasuramonton et al. ....................... 280/728.2 |

FOREIGN PATENT DOCUMENTS

| DE | 43 06 615 A1 | 9/1994 |
|---|---|---|
| DE | 196 33 883 A1 | 2/1998 |
| DE | 20 2005 002 329 U1 | 6/2005 |
| DE | 10 2004 014 681 B3 | 7/2005 |
| DE | 602 05 797 T2 | 6/2006 |
| EP | 0 670 247 A1 | 1/1995 |
| EP | 0 700 808 A1 | 3/1996 |
| EP | 0 810 126 A1 | 12/1997 |

(Continued)

*Primary Examiner* — Ruth Ilan
(74) *Attorney, Agent, or Firm* — Foley & Lardner LLP

(57) ABSTRACT

An airbag arrangement includes an airbag with at least one inflatable chamber and a first opening; and a cover that at least partially covers the first opening of the airbag and that comprises a second opening. The first and second openings are designed such that the chamber of the airbag is accessible through the first and second openings. The first opening is designed in a first layer of an airbag material and the second opening is designed in a second layer of an airbag material. At least one part projects into the airbag through the first and the second opening, whereby the first and the second layer are restrained by the part projecting into the airbag in the area of the openings such that a section of the rim of the first and a section of the rim of the second opening rest closely against the part.

21 Claims, 16 Drawing Sheets

FOREIGN PATENT DOCUMENTS

| | | |
|---|---|---|
| EP | 0 917 994 A1 | 5/1999 |
| EP | 1 361 120 A2 | 11/2003 |
| EP | 1 686 016 A2 | 8/2006 |
| FR | 2 724 144 | 3/1996 |
| GB | 2 421 932 A | 7/2006 |
| WO | WO 2004/056618 A1 | 7/2004 |
| WO | WO 2006/084449 A1 | 8/2006 |

* cited by examiner

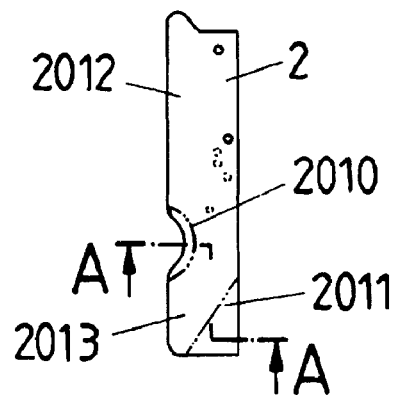
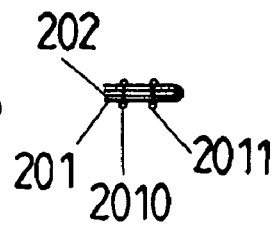
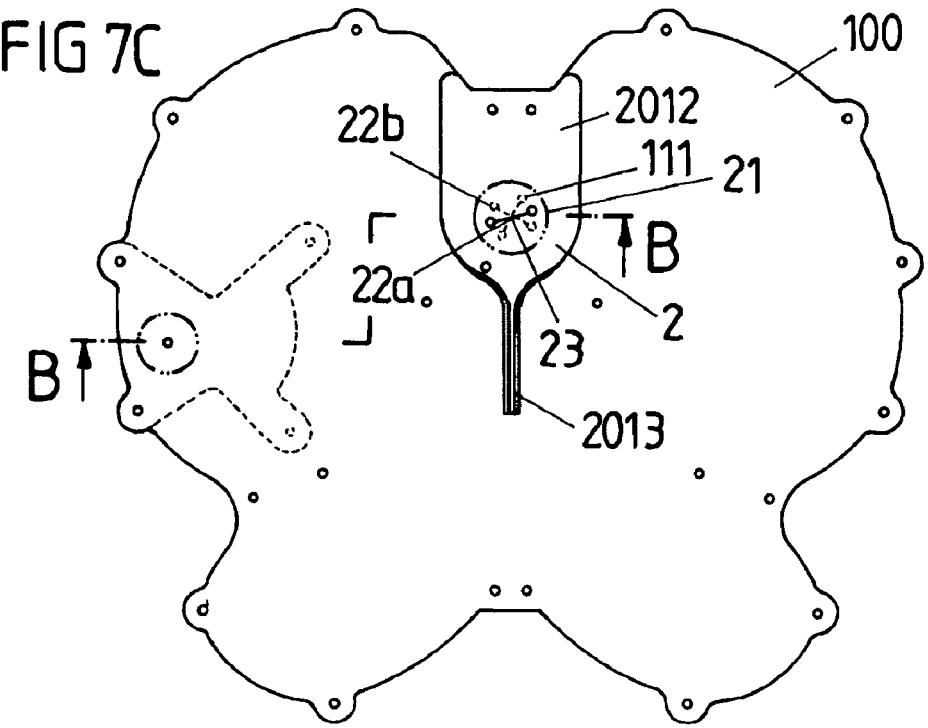
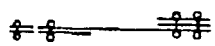

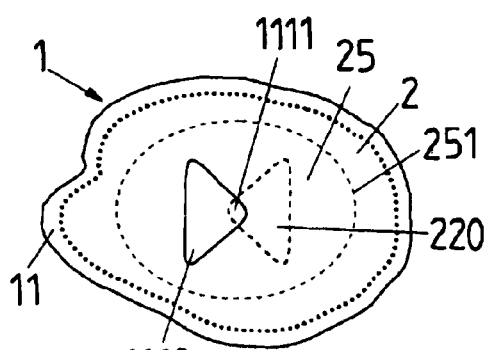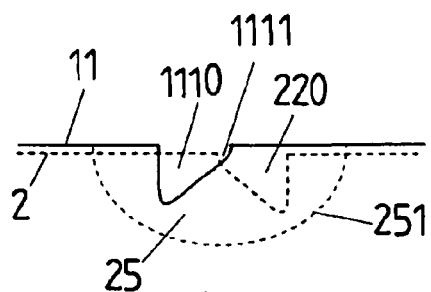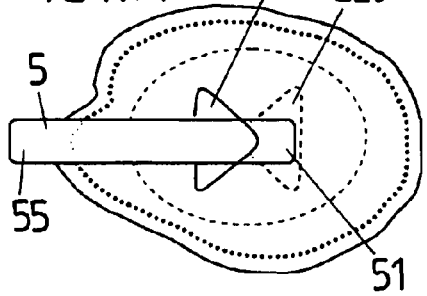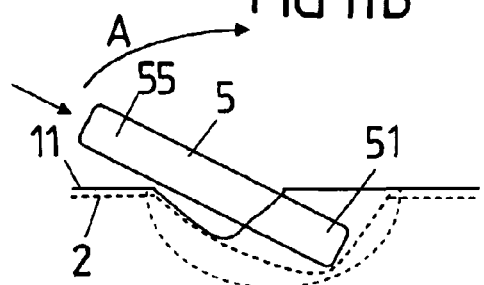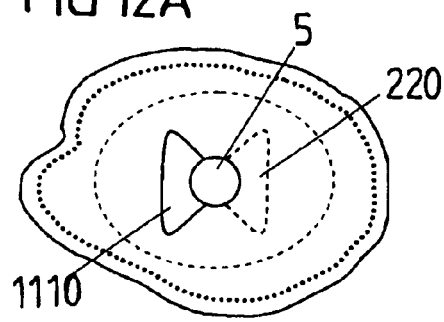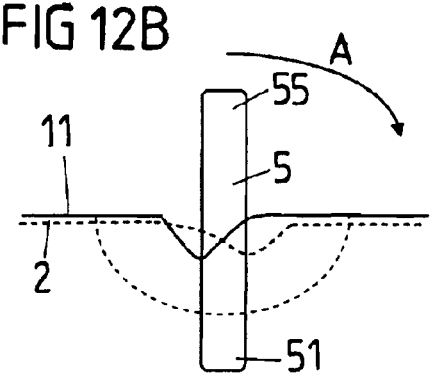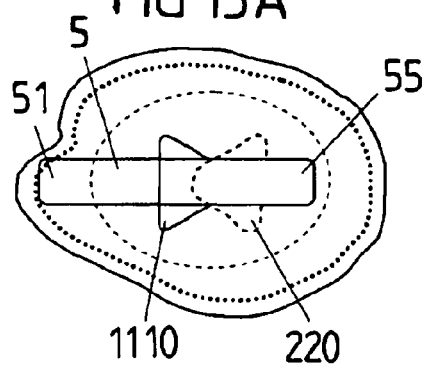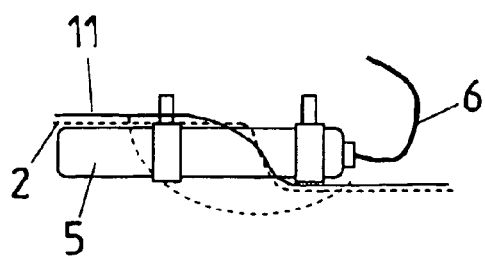

AIRBAG ARRANGEMENT FOR A VEHICLE OCCUPANT RESTRAINT SYSTEM AND A METHOD FOR THE PRODUCTION OF AN AIRBAG MODULE

CROSS-REFERENCE TO RELATED PATENT APPLICATIONS

This application is a Continuation of International Application PCT/EP2008/054799, filed Apr. 21, 2008, which was published in German as WO 2008/129031 A2. The foregoing International Application is incorporated herein by reference in its entirety.

BACKGROUND

The application relates to an airbag arrangement for a vehicle occupant restraint system and a method for the production of an airbag module.

It is known to provide an outflow opening or multiple outflow openings in an airbag of a vehicle occupant restraint system for discharging gas from the partially or completely inflated airbag in a controlled manner. The controlled discharging of gas has the purpose to fill the airbag adaptively for instance in dependency of body parameters (weight, height) of an occupant. An airbag with an outflow opening for an adaptive inflation is for instance described in EP 0 670 247 A 1.

SUMMARY

A problem to be solved by an embodiment disclosed herein is to provide an airbag arrangement with an airbag which has an access to a chamber of the airbag which is obtainable in a simple manner.

A further object of at least one disclosed embodiment is to provide a method which allows for the production of an airbag module with a gas generator in a simple manner.

According to an exemplary embodiment an airbag arrangement for a vehicle occupant restraint system is provided with
- an airbag that comprises at least one inflatable chamber and at least one first opening; and
- a cover that at least partially covers the first opening of the airbag and that comprises at least one second opening whereby
- the first and the second opening are designed and arranged such that the chamber or the airbag is accessible through the first and the second opening.

The first and the second opening are exemplary designed such that gas can flow out of the chamber of the airbag through the first and second opening, thus the surrounding of the chamber is also accessible from the chamber. The first and the second opening form therefore an outflow opening from which gas can flow off the partially or complete inflated chamber of the airbag. As a matter of course multiple first openings and multiple second openings can be provided which in each case can also be differently designed, e.g., can have different geometries.

The chamber of the airbag is for instance delimited by an airbag material (for instance a textile fabric) whereby the first opening is designed in the airbag material. It is insignificant on which side of the airbag, e.g. the airbag material, the cover is arranged. The cover can be also made of an airbag material and can be arranged inside and outside, e.g. on a side of the airbag material facing away from the inflatable chamber or on a side of the airbag material facing towards the inflatable chamber.

Furthermore, the first and the second opening can be arranged such that the chamber of the airbag is accessible from outside of the airbag. The first opening for instance is formed in an area of the airbag material which delimits the chamber of the airbag to the outside, e.g. separating it from the surrounding.

In another further exemplary embodiment the first and the second opening are designed and arranged such that the chamber of the airbag is accessible from a further chamber of the airbag. Here, the first opening is arranged in a section of the airbag (of the airbag material delimiting the chamber) which separates two chambers of the airbag from each other.

Furthermore, the first and/or the second opening can be designed in a stretchable material such that the size of the first and/or the second opening depend on the internal pressure of the airbag, e.g. the two openings form together an outflow opening which effective outflow diameter depends on the internal pressure in the airbag. In particular, the airbag material which delimits the chamber of the airbag and in which the first opening is designed in can be made of such stretchable material. Furthermore, the cover can have a stretchable material or being made of a stretchable material and the second opening can be designed in this stretchable material. The stretchable material can be for instance a fabric layer or a composite of multiple fabric layers.

The pressure dependency of the first or the second opening can for instance be adjusted by the geometry and number of the first and second openings, the kind of connection of the cover with the airbag or by the alignment of (for instance slit-like) opening in respect to a fabric alignment, if the airbag material and/or the cover are formed by one fabric. For instance, the openings are designed such that during deployment and in the working area of the airbag almost no gas can flow to the outside over the first and the second opening and only, when the inner pressure in the airbag reaches a specific value, the size of the opening allows a discharge of gas from the airbag interior (from the chamber of the airbag). This value can depend for instance on the tightness of the airbag or desired safety potential (depending for instance on the weight of the vehicle occupant).

In a further exemplary embodiment the first and/or the second opening are designed as extending longitudinal, in particular slit-like. The shape of the slits can be hereby arbitrary, for instance the slits can be straight or also curved. In particular, a slit-like formed first opening and a slit-like formed second opening can intersect for instance in a wide angle. In case of intersecting openings an overlapping area of the first with the second opening is created whereby the overlapping area is an entrance opening to the chamber of the airbag.

The cover which covers the first opening of the airbag material can be connected to the airbag for instance by sewing or gluing. Furthermore, the first opening can be formed as a part manufactured separately from the airbag whereby the separately manufactured part in the finished airbag is connected to the airbag.

In a further example the end access to the chamber of the airbag is premanufactured. For this, a cover manufactured separately from the airbag with a second opening is at first connected to a part also manufactured separately in which the first opening is designed (for instance sewed) before the combination of the separate part with the first opening and the cover with the second opening is attached to the airbag. In this example, the airbag has for instance an additional opening area towards the chamber via which the premanufactured combination of the separate part and the cover is applied.

The embodiments disclosed herein are not restricted to provide an adaptive outflow opening for discharging gas from the chamber of the airbag. In fact, the entrance to the chamber of the airbag formed by the first and the second opening can also be used alternatively or additionally to the discharging function to project a part into the airbag. As a matter of course the first and the second opening can also be designed such that they serve exclusively as outflow openings.

A part can project for instance from the outside of the airbag into the chamber of the airbag or into another inner area of the airbag being in connection with the chamber. Furthermore, the first and the second opening can also be arranged on an airbag material which separates two chambers of the airbag from each other and the part projects through the first and the second opening from one chamber into another chamber.

Examples for a part which projects through the first and the second opening into the airbag are a gas generator which at least partially projects into the airbag or a fixing element for fixing the airbag to a vehicle structure. In particular, the chamber of the airbag can be formed by a first airbag material (fabric layer) and the cover can be formed by a second airbag material.

Furthermore, the part can be an electrical wire which is connected to a part arranged in the airbag (for instance in the chamber of the airbag), in particular a gas generator.

For instance, the first opening is formed in a first layer of the airbag material and the second opening is formed in a second layer of the airbag material and the first and the second layer are braced by the part projecting into the airbag through the first and the second opening in the area of the opening such that a section of the rim of the first and a section of the rim of the second opening rest closely against the part.

In a further exemplary embodiment the first and/or the second opening are adjacent to a flap which is so flexible that the first or the second opening can be at least partially released by bending the flap. Moreover, the flap can be connected to the rim of the opening such that the cross section of the opening is changeable by pulling the flap in order to facilitate the insertion of a part through the opening.

The generated restraint of the first and the second fabric layer can be influenced for instance by a seam which connects the first airbag material in the area of the outflow opening with the first airbag material. Furthermore, the degree of restraint can be influenced alternatively or additionally by the geometry of the first and the second opening or their position to each other.

Furthermore, the flap can have a fixing structure via which the gas generator is fixed to the flap. Additionally, further flaps can be provided which are for instance fixed on the outside on the airbag and for instance serve as a protection for the gas generator.

In a further exemplary embodiment an airbag arrangement includes an airbag comprising at least on inflatable chamber and at least one first opening; and
a cover that at least partially covers the first opening of the airbag, wherein
the chamber of the airbag is accessible through the part of the first opening which is not covered by the cover.

The present application further discloses a method for the production of an airbag module using an airbag arrangement described above whereby the cover is arranged in the inside on an airbag material which delimits the chamber of the airbag. The method includes the following steps:

passing a first end of a gas generator through the first opening arranged in the airbag material and through the second opening provided in the cover such that the gas generator takes a first position, whereby in the first position the first end of the gas generator projects into the chamber of the airbag and is further away from the first than from the second opening and the second end of the gas generator opposing the first end is outside of the airbag;

turning the gas generator into a second position in which the first end is closer to the first than to the second opening.

Exemplary the turning of the gas generator can be carried out at about 180°. In the disclosed method, the gas generator in end position (e.g. in the second position) is guided through a pass-through opening formed by the first and the second opening such that the rim of the pass-through opening rests closely against the gas generator and counteracts a discharge of gas out of the chamber of the airbag through the pass-through opening.

BRIEF DESCRIPTION OF THE DRAWINGS

The invention is explained in the following in detail by the means of examples in respect to the Figures.

FIGS. 7A-7E show steps of the production of an airbag for an airbag arrangement.

FIGS. 10A-13B show views of different steps while carrying out the disclosed method.

DETAILED DESCRIPTION

Figure 1:
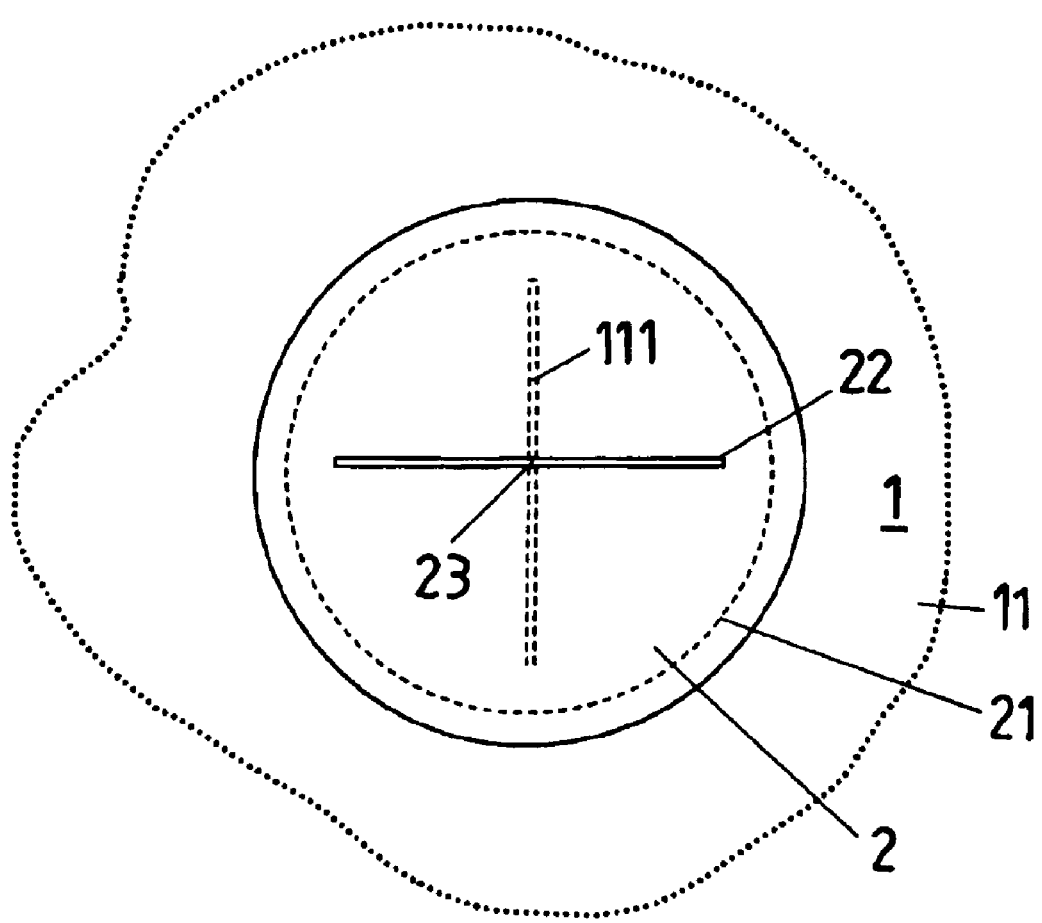
FIG. 1 shows a section of an airbag of an airbag arrangement according to a first embodiment.

FIG. 1 relates to a first embodiment and shows a section of an airbag 1 which has an airbag material in form of a fabric layer 11 whereby the fabric layer 11 delimits an inflatable chamber of the airbag 1. In the fabric layer 11 a first opening is designed in form of a first slit 111. In the area of the slit 111 a cover is located in form of a circular functional layer 2, which covers slit 111 with a central area. The functional layer 2 is connected to the fabric layer 11 of the airbag 1 by the means of a circumferential seam 21.

A second opening in form of a second slit 22, which vertical intersects with the first slit 111, is designed in the functional layer 2. An overlapping area 23 is formed in which the first slit 111 and the second slit 22 overlap so that the interior of the airbag (the chamber formed by the airbag layer 11) is accessible from the outside through the first and the second slit 111, 22, e.g. in particular through the overlapping area 23.

In the first embodiment the functional layer 2 is arranged on the outside of the airbag layer 11. As an alternative or in addition it would be possible to provide the functional layer or also a further functional layer on an inner side of the airbag that is on a side of the airbag layer 11 which faces towards the inflatable chamber of the airbag formed by the airbag layer 11.

Figure 2:
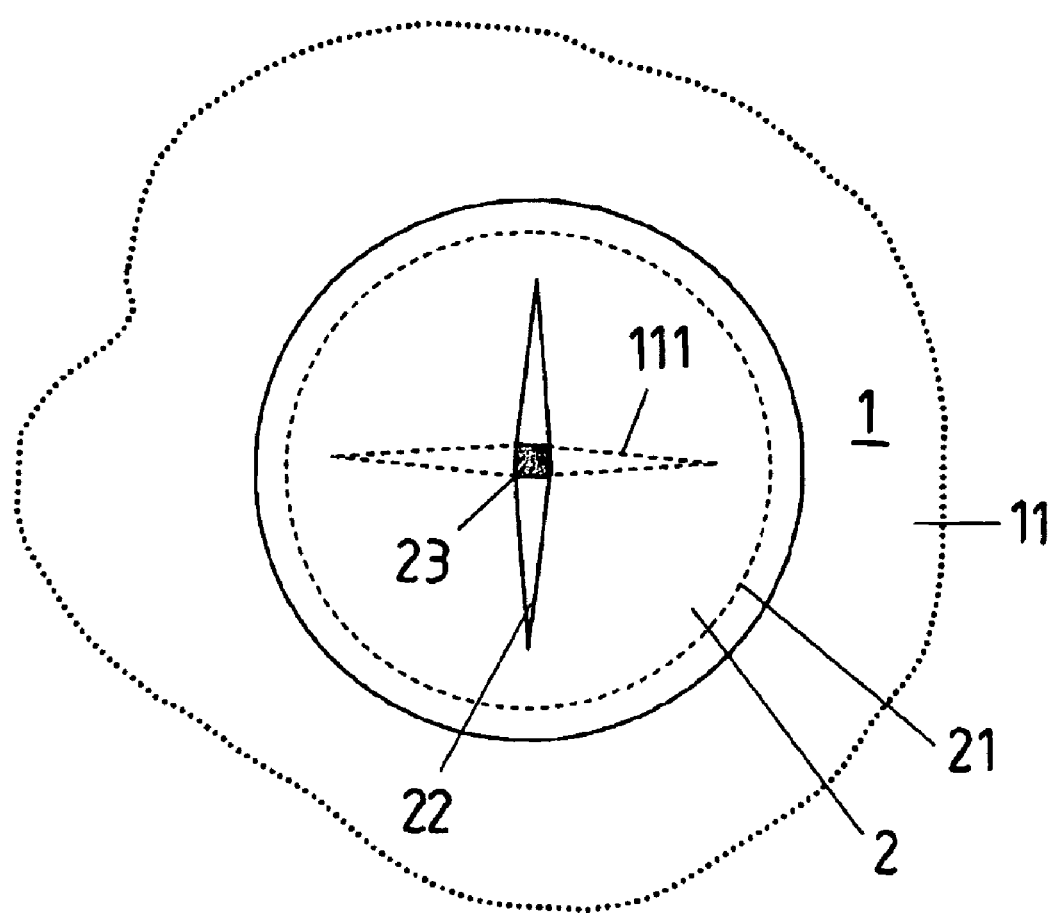
FIG. 2 shows the section of the airbag of FIG. 1 which is at least partially inflated.

FIG. 2 relates to a second embodiment and corresponds essentially to the first embodiment shown in FIG. 1. A first slit 111 is formed in an airbag layer 11 which is covered by a functional layer 2. A second slit 22 is arranged in the functional layer 2 which is oriented vertical to the first slit 111 and overlaps with the first slit in an overlapping area 23.

During inflation of the airbag the airbag layer 11 and the functional layer 2 are stretched by the internal pressure of the airbag so that slits 111 and 22 expand. Thus, in particular the overlapping area 23 and therefore the outflow opening formed by the first and the second slit are enlarged whereby the degree of enlargement depends on the internal pressure present in the airbag. The higher the internal pressure the more the airbag material 11 and the material of the functional layer 2 stretch so that the first and the second slit 111, 22 form together a pressure dependent, e.g. adaptive, outflow opening.

Figure 3:
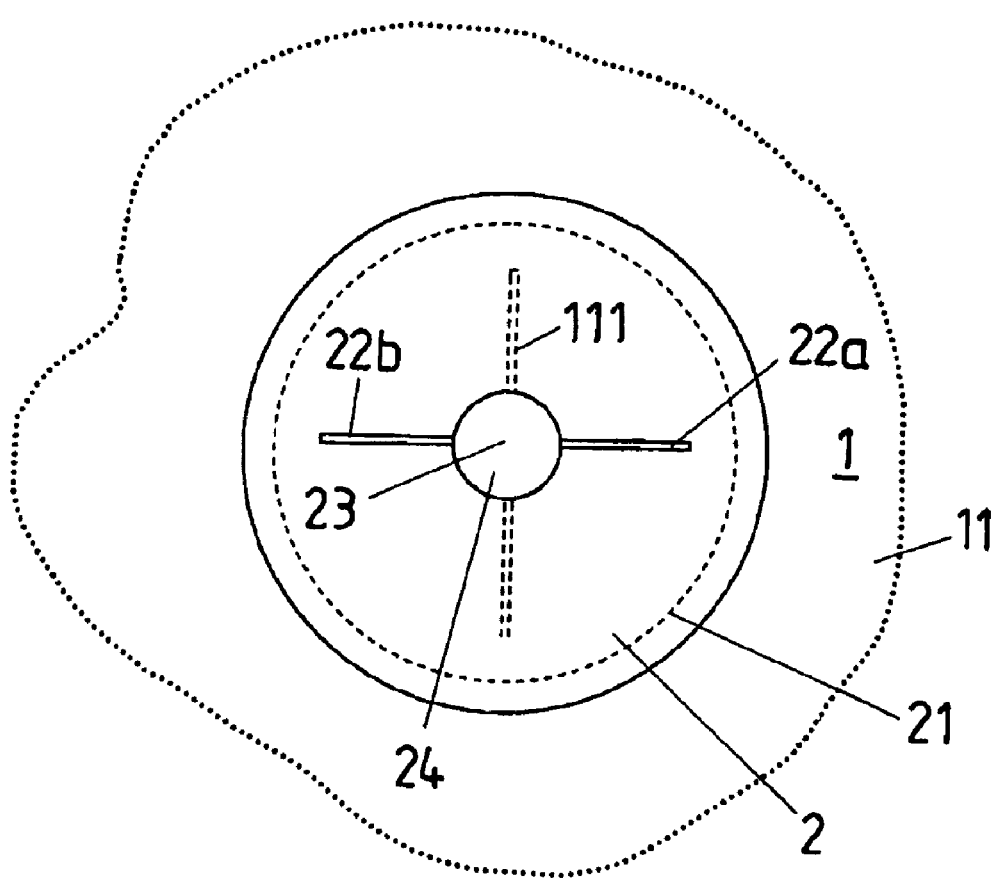
FIG. 3 shows a section of an airbag of an airbag arrangement according to a second embodiment.

FIG. 3 shows a section of an airbag of an airbag arrangement according to a third embodiment. This variant corresponds also essentially to the first embodiment, however the second opening which is formed in the functional layer 2 fixed outside on the airbag is not solely slit-like formed but has also a circular area 24 from which two each other opposing slit-like areas 22a, 22b extend radially. Due to the additional circular opening 24 an overlapping area 23 with a first slit 111 formed in the airbag layer 11 enlarges whereby an outflow opening with a larger effective opening is created so that a larger gas stream can flow out of the airbag.

The FIGS. 4A to 4F relate to further variants, in particular different examples of slit-like first and second openings 111, 22 which are formed in an airbag layer 11 or in a functional layer 2.

Figure 4A:
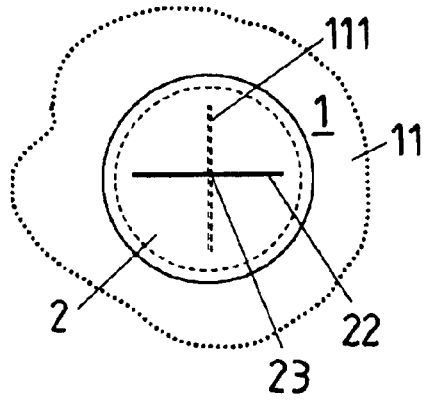
FIG. 4A shows a section of an airbag according to a further variant.
Figure 4B:
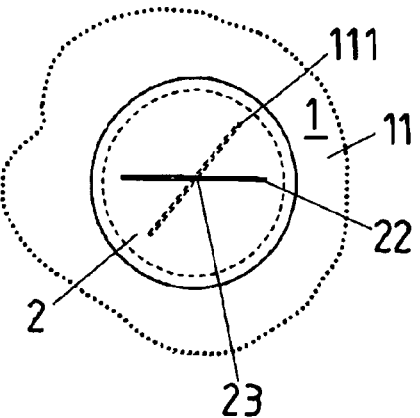
FIG. 4B shows a section of an airbag according to a further variant.

FIG. 4A relates to the embodiment shown in FIG. 1 whereupon a slit-like first and a slit-like second opening intersect vertically. In the embodiment of FIG. 4B the slit-like first opening 111 and the slit-like second opening 22 do not intersect in a right angle but continue obliquely so that they enclose an acute angle.

Figure 4C:
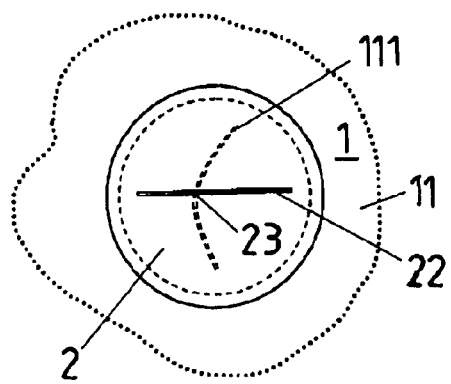
FIG. 4C shows a section of an airbag according to a further variant.

In FIG. 4C the first slit-like opening 111 is formed in a curved manner whereby it still intersects with the opening 22 formed in the functional layer 2 and forms an overlapping area 23 with it.

Figure 4D:
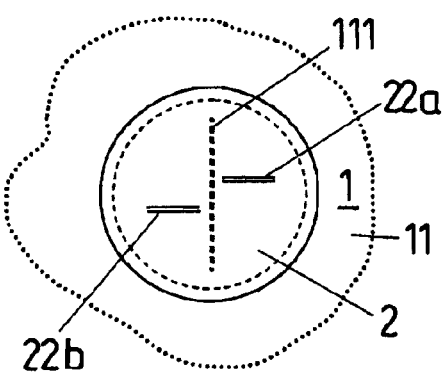
FIG. 4D shows a section of an airbag according to a further variant.

According to FIG. 4D the airbag layer 11 has a single first slit 111 while the functional layer 2 has two second openings in form of two slits 22a and 22b. The slits 22a and 22b are arranged in parallel to each other whereby they are arranged vertically to the first slit 111 and in a direction along the slit 111 offset with respect to one another. The second slits 22a, 22b do not overlap with the first slit 111. However, in the area of the first slit the functional layer is arranged with a distance to the airbag layer 11 so that gas can leave through the first slit 111 and can flow out from the airbag through the slits 22a, 22b.

Figure 4E:
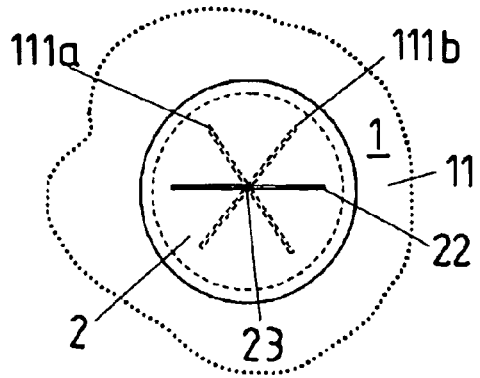
FIG. 4E shows a section of an airbag according to a further variant.

The variant shown in FIG. 4E has two slit-like first openings 111a, 111b which run crossed to one another. A singular second slit 22 is arranged as a second opening in the functional layer 2 which runs in an angle to the slit 111a as well as to the slit 111b in the airbag layer 11. The free slits 111a, 111b and 22 are arranged to each other such that in each case a central section of a slit overlaps with a central section of the two other slits, whereby an overlapping area 23 is formed which is central in respect to the respective length of the slits. Furthermore, the slits are rotated by 60° in relation to one another.

Figure 4F:
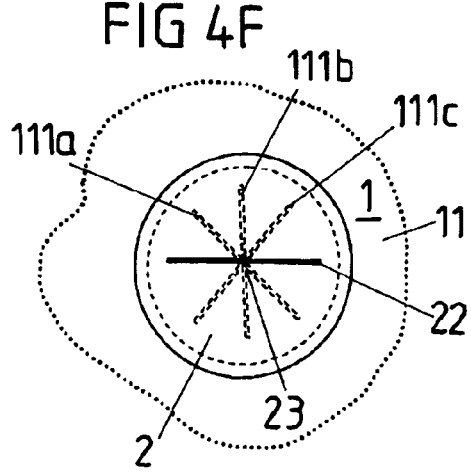
FIG. 4F shows a section of an airbag according to a further variant.

In embodiment of FIG. 4F three first openings in form of the three slits 111a, 111b and 111c are arranged in the airbag layer 11 which are oriented crosswise to one single slit 22 present in the functional layer 2. The slits 111a, 111b, 111c and 22 form similar to FIG. 4E a central overlapping area 23 and are rotated by 40° to one another around a common centre point.

Figure 5:
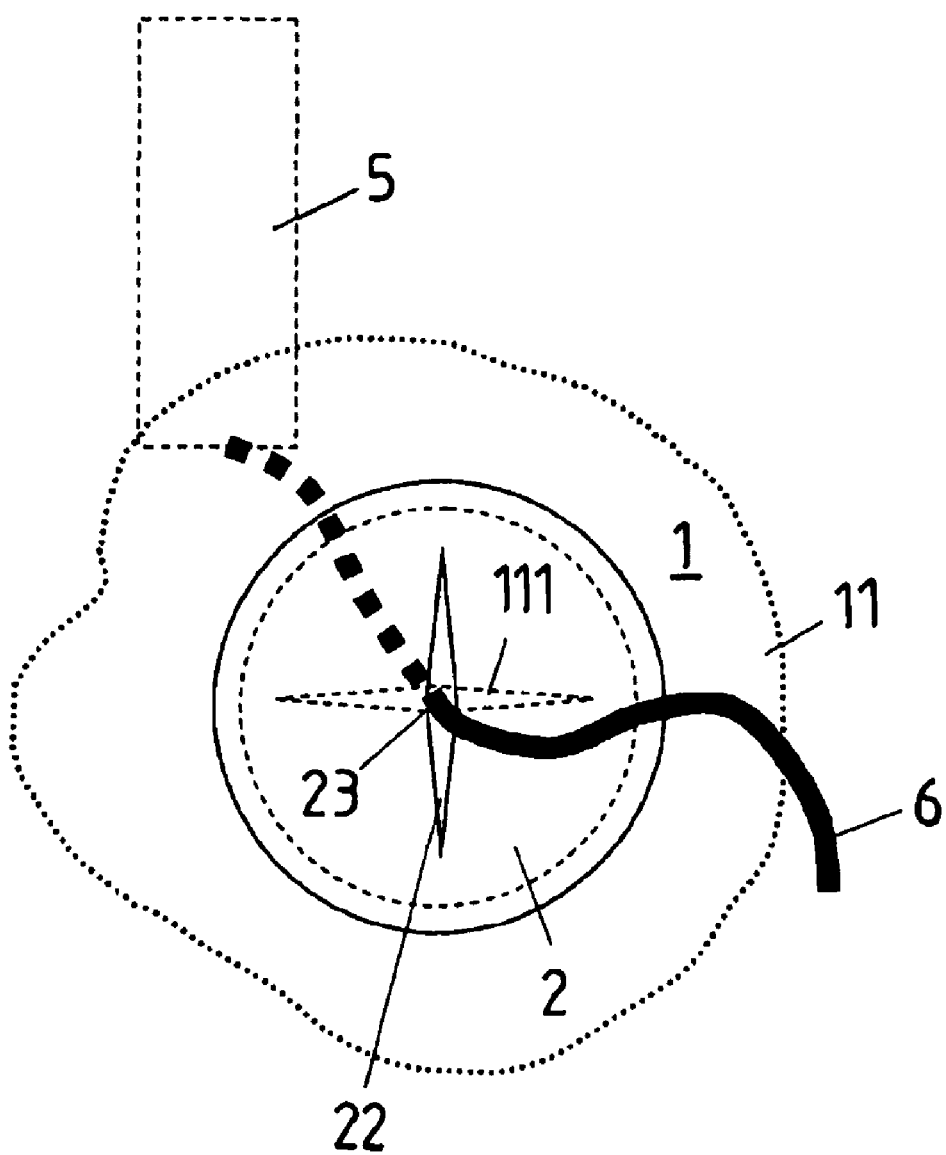
FIG. 5 shows a section of an airbag of an airbag arrangement according to a further embodiment.

FIG. 5 shows a section of an airbag of an airbag arrangement according to a further embodiment. The embodiment corresponds essentially to the second example which is shown in FIG. 2. An airbag layer 11 has a slit-like first opening 111 which is covered by a functional layer 2. In the functional layer 2 an also slit-like second opening 22 is designed which vertical intersects the first opening 111. In an overlapping area 23 in which the first opening 111 overlaps with the second opening 22 an axis to a chamber of the airbag 1 delimited by the airbag layer 11 is formed.

In the chamber of the airbag 1 a gas generator 5 for inflating the chamber is arranged. The gas generator 5 is connected via an electrical connecting wire in form of an ignition cable 6 with a steering device (not shown) arranged outside of the airbag 1. The ignition cable 6 is guided through the overlapping area 23 formed by the first opening 111 and the second opening 22 from the chamber of the airbag 1 out of the airbag 1. The first and the second opening 111, 22 can be arranged and designed such that the overlapping area 23 is exclusively designed as a lead through for the cable 6. In a further variant the openings 111 and 22 are arranged and designed such that they form an axis for the ignition cable as well as an adaptive outflow opening via which the gas can flow out of the airbag.

Figure 6:
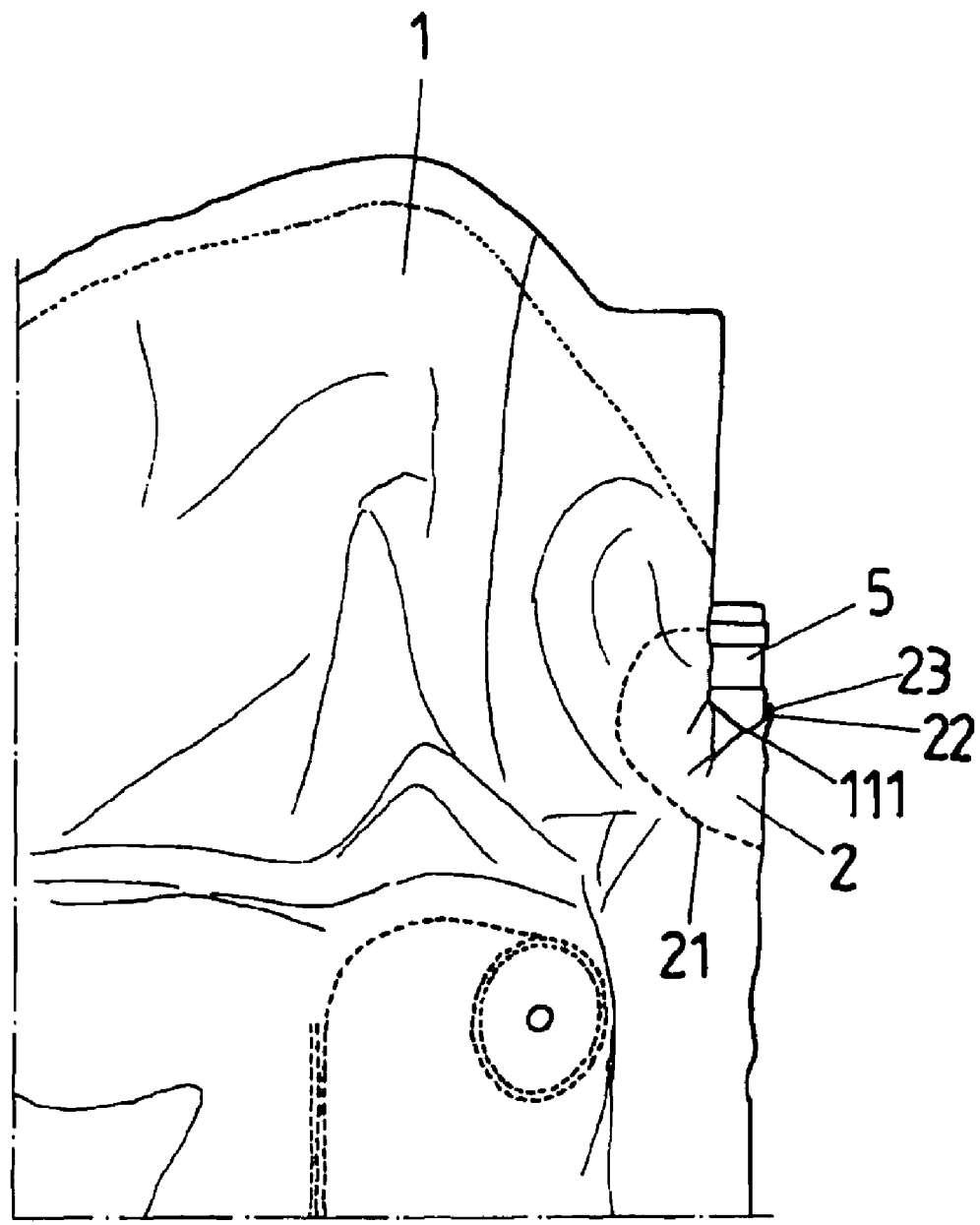
FIG. 6 shows a section of an airbag of an airbag arrangement according to yet another further embodiment.

FIG. 6 shows a further variant of the airbag arrangement. An airbag 1 is shown in an exterior view. The airbag 1 has a first opening 111 in an airbag layer which is covered by functional layer 2 whereby the functional layer is sewed by a seam 21 to the interior side of the airbag 1 and is therefore not to be seen in FIG. 6. In the functional layer a second opening is arranged which overlaps with the first opening 111 so that an overlapping area 23 is designed which forms an axis to the airbag interior. A gas generator 5 projects with a section through the overlapping area 23 into the airbag interior.

Figure 7E:
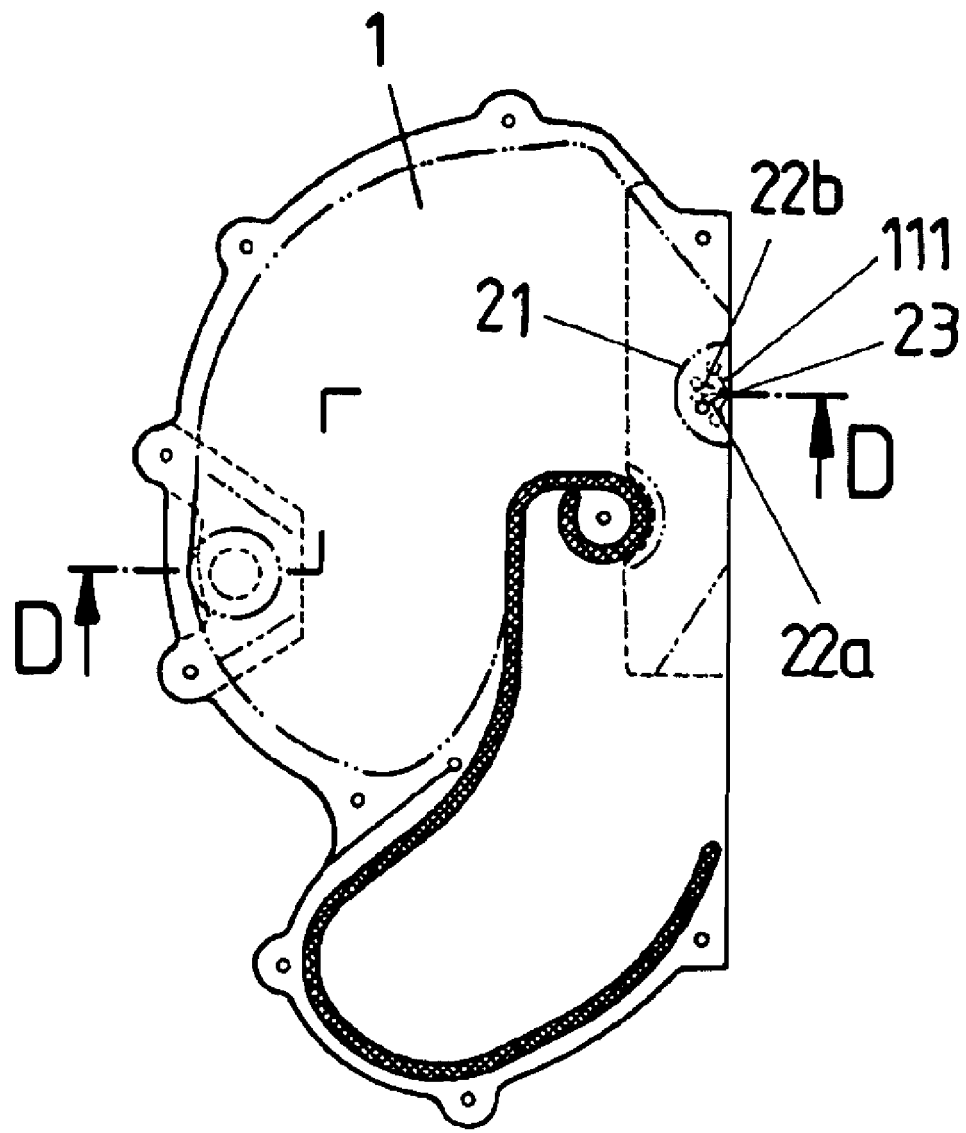

FIGS. 7A to 7E relate to a variant for producing an airbag for an airbag arrangement for instance according to FIG. 6. FIG. 7A shows a cover manufactured separately from the airbag in form of a functional layer. FIG. 7B is a sectional view of the functional layer 2 (along A-A). The functional layer 2 has two material layers 201 and 202 placed above each other and is folded in an end section 2013 whereby the folded subsections of the functional layer 2 are sewed by two seams 2010 and 2011. A section 2012 of the functional layer 2 facing away from the end section 2013 on the other side can be flapped apart. In this status (flapped section 2012 and sewed section 2013) the functional layer 2 is arranged on an airbag pre-cut section 100. This is shown in FIG. 7C.

The airbag pre-cut section 100 is in respect to a central symmetrical axis a symmetrical fabric pre-cut section which has a slit-like first opening 111 (drawn in a dotted line in FIG. 7C). The functional layer 2 is arranged in the area of the central symmetrical axis of the airbag pre-cut section 100 and connected by a circular seam 21 to the airbag pre-cut section 100 such that it covers the first opening 111.

Furthermore, in each of the two layers 201, 202 of the functional layer 2 a slit-like second opening 22a or 22b is designed in each case. The slits 22a, 22b run in an angle to one another and are oriented such that they overlap with a central section with the first slit 111 so that the centre of the slits form an overlapping area 23 and an access to the interior of the airbag to be generated is formed.

FIG. 7D shows a cut (along B-B) through the airbag pre-cut section 100 of FIG. 7C to which the functional layer 2 is sewed. The airbag formed from the airbag pre-cut section 100 is shown in FIG. 7E. The airbag pre-cut section 100 is folded along its central symmetrical axis and sewed by different seams which partially run along its outer circumference so that the functional layer 2 is in the interior (for instance in an inflatable chamber) of the completed airbag 1. In the completed airbag 1 the access opening which is formed by the overlapping area 23 of the slits 111, 22a, 22b serves for instance the purpose to project a part of the gas generator (not shown) into the airbag.

Figure 8A:
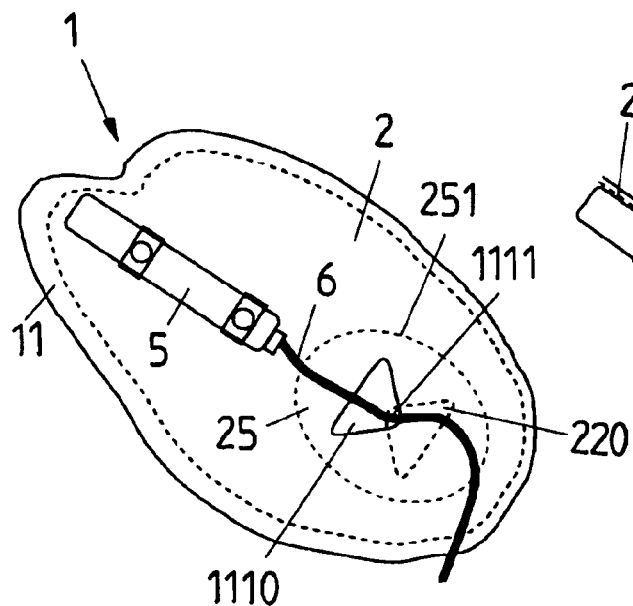
FIG. 8A shows a top view of a further embodiment of the airbag arrangement.
Figure 8B:
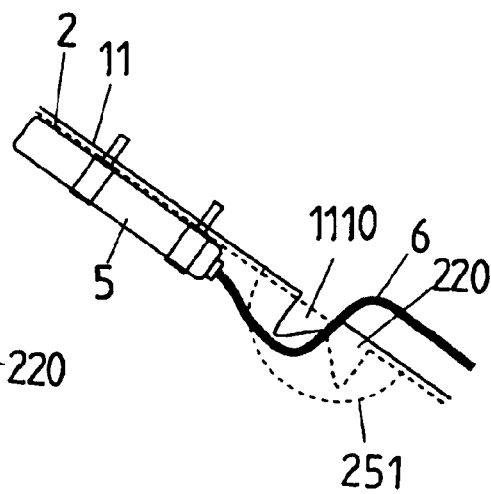
FIG. 8B shows a side view of the airbag arrangement according to FIG. 8A.

The FIGS. 8A and 8B relate to a further embodiment whereby FIG. 8B is a side view of the arrangement of FIG. 8A in "butterfly" prospective. A sub-area of an airbag 1 is shown which has an inflatable chamber which is delimited by a first layer 11 of an airbag material. On the inner side of the airbag layer 11 a second layer 2 of an airbag material (indicated by a dotted line, which follows the rim of the first layer 11) is arranged. The first and the second layer 11, 2 can be connected to each other for instance via a circumferential seam. In the first airbag layer 11 a first opening 1110 and in the second airbag layer 2 a second opening 220 is provided which are formed as a triangle, respectively. The (curved) tips of the openings 1110 and 220 overlap whereby a pass through opening 1111 to the chamber of the airbag is formed by the overlap.

In the chamber of airbag 1 a gas generator 5 is arranged whose ignition cable 6 is guided out from the airbag interior through the pass through opening 1111 formed by the overlapping openings 1110, 220. An elliptical area 25 of the second layer 2 which extends around the openings 1110, 220 is sewed to the first airbag layer 11 by a seam 251 (from the inside). The layers 11, 2 are designed such and the openings 1110, 220 are positioned to each other such that the layers 11, 2 can be restraint to each other during guiding the cable 6 and rim sections of the first and the second opening 1110, 220, e.g. the rim of the pass through opening 1111 rest closely against the cable 6 after assembly of cable 6.

The seam 251 of the openings 1110, 220 is not necessarily required for the restraining of the layers e.g. for a sealing effect. The effect can also be achieved without the seam whereby in particular also other adjacent seams, for instance circumferential seams and/or other fixing seams, effect a fixation of layers 11, 2 which influence the restraint.

Figure 9A:
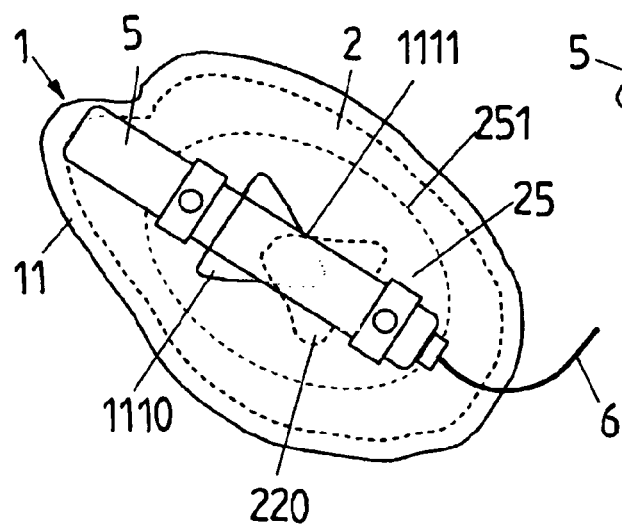
FIG. 9A shows a top view of a further embodiment of the airbag arrangement.
Figure 9B:
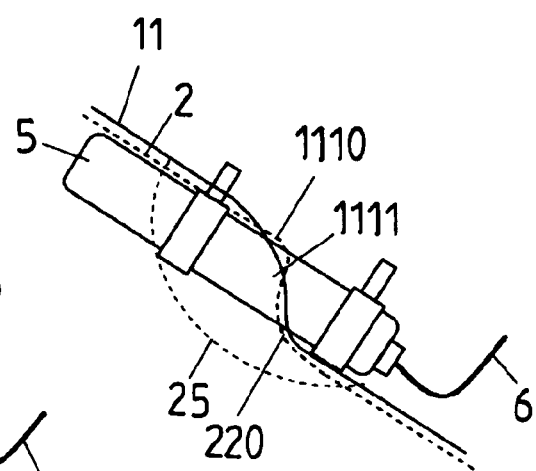
FIG. 9B shows a side view of the airbag arrangement according to FIG. 9A.

FIGS. 9A and 9B relate to a further variant whereby a gas generator 5 is not completely in the interior of the airbag 1 but sticks partially out from the airbag. Similar to FIGS. 8A, 8B the airbag 1 of FIG. 9A, 9B has a first and a second layer 11, 2 in which in each case a (triangular shaped) opening 1110 or 220 is arranged, which overlap each other in sections, whereby the overlap forms a pass through opening 1111 through which the airbag interior is accessible from the outside. The gas generator 5 projects from the outside through the pass through opening 1111 into the airbag interior e.g. into the chamber of the airbag, Furthermore, the openings 1110, 220 are again surrounded by a seam 251 which connects the second layer 2 with the first layer 11. The layers 11, 2 and the openings 1110 and 220 are designed and positioned to each other such that the layers 11, 2 are restraint to each other by the gas generator projecting through the openings 1110 and 220 such that the rim of the pass through opening 1111 rests against the gas generator 5 and therefore the pass through opening 1111 is sealed.

In FIGS. 10A to 13B it is shown how an airbag can be guided through the openings 1110, 220 and can be brought into the end position shown in FIG. 9A. The FIGS. 10A, 10B show the airbag without gas generator whereby the airbag arrangement corresponds to the one of FIGS. 9A and 9B. FIGS. 10B to 13B show the arrangement in a lateral butterfly view, respectively.

The gas generator 5 is inserted into the airbag 1 in the following way: At first a first end 51 of the (tubular) gas generator 5 is slit through the (outer) first and the (inner) second opening 1110, 220 so that the end 51 projects into the chamber of the airbag and a second end 55 of the gas generator opposing the first end 51 is located outside of the airbag 1. Hereby the layers 11, 2 can be designed in a stretchable manner so that they stretch somewhat during insertion of the gas generator and the end 51 can be inserted into the chamber of the airbag without problems. In this first position the first end 51 is further away from the second than from the first opening (FIG. 11A, 11B).

Subsequently, the gas generator 5 is rotated around ca. 180° (along the arrow A; compare FIGS. 11B to 13B) into a second position (end position, FIG. 13A which corresponds to the one of FIG. 9A). In the end position the first end 51 is closer to the first than to the second opening.

Figure 14A:
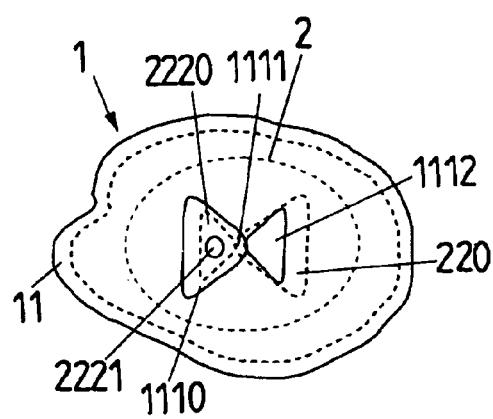
FIGS. 14A-16B show views of different steps producing a variant of the airbag arrangement.

Alternatively, the gas generator can also be inserted directly "in the right direction", e.g. without applying a 100° rotation. This is shown in FIGS. 14A to 16B whereby the FIGS. 14B to 16B are again shown in a butterfly perspective.

Figure 16A:
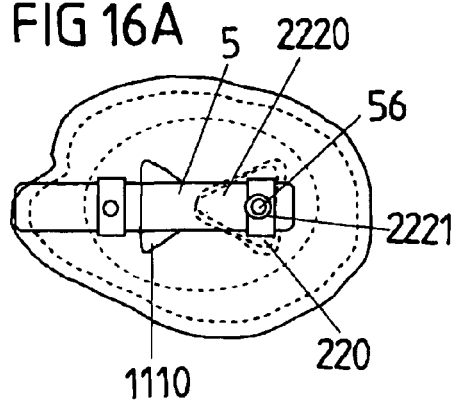
Figure 16B:
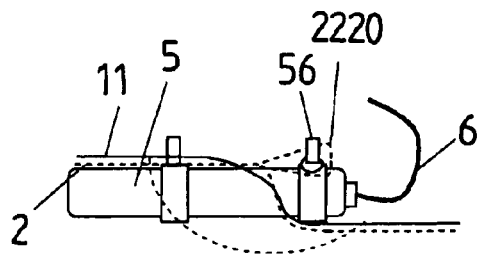

In this variant the gas generator 5 is inserted directly in the orientation of the desired end position through the pass through opening 1111 which is formed by the overlap of the first opening 1110 and the second opening 220 whereby the airbag layers 11, 2 can be designed stretchable so that this is possible without a problem. The gas generator 5 is inserted through the pass through opening 1111 to its end position (FIG. 16A).

In the embodiment of FIGS. 14A to 16B a first flap 1112 or a second flap 2220 adjoin to the openings 1110 or 220 whereby the flaps 2220, 1112 are also triangular-shaped and connected with their tip to the rim of a tip of the respective opening. The flaps are formed for instance by a corresponding cutting out (or punching out) of the openings 1110, 220 whereby in the area of the respective tips of the triangular-shaped openings 1110, 220 the cut is interrupted.

Figure 14B:
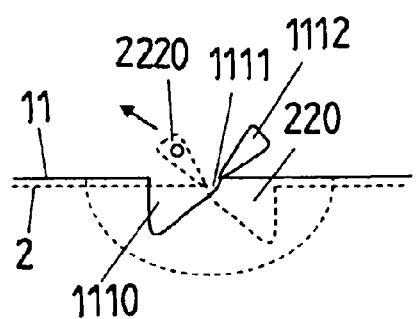
Figure 15A:
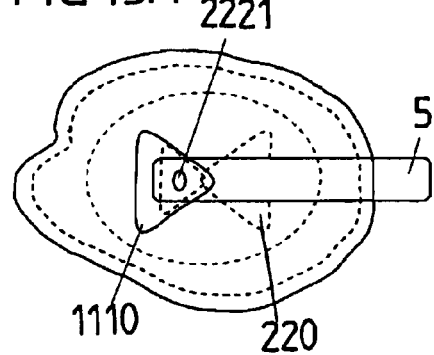
Figure 15B:
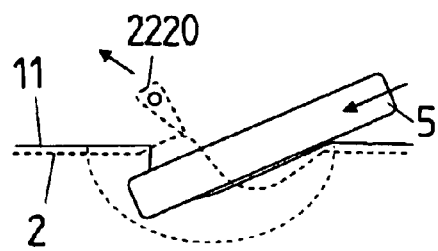

The flaps 2220, 1112 are bent such that they project into the area of the respective other opening; compare in particular FIGS. 14B and 15B. After insertion of the gas generator 5 the (inner) second flap 2220 is flapped back into the direction of the second opening 220 and is fixed with a fastening bolt 56 to the gas generator 5 (or a clamp surrounding the gas generator 5). For this, the flap 2220 has a fixing structure in form of an opening 2221 through which the bolt 56 reaches.

Further embodiments or arrangement variants of the first and second openings which are also suitable for instance for passing through a gas generator are shown in FIGS. 17A to 17K. For instance, the first and the second opening 1110, 220 do not have to be necessarily arranged in an overlapping manner (compare FIGS. 17A to 17D, 17F, 17H, 17I). Furthermore, the openings do not of course have to be triangular-shaped but can in particular also be slit-like—as shown in the FIGS. 4A to 4F. Other geometries are of course also possible for instance curved openings (FIG. 17B, 17G) or circular openings (FIGS. 17H to 17G) or combinations of different openings.

Figure 17A:
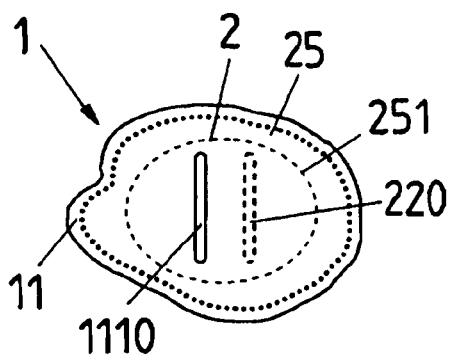
FIGS. 17A-17M show further variants of the airbag arrangement.
Figure 17B:
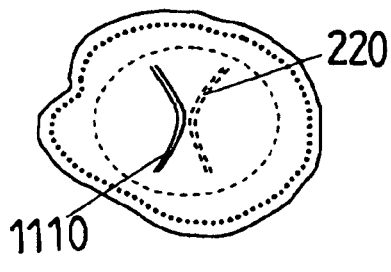
Figure 17C:
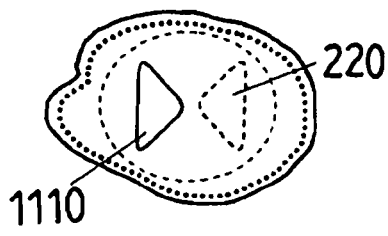
Figure 17D:
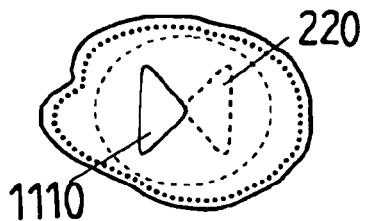
Figure 17E:
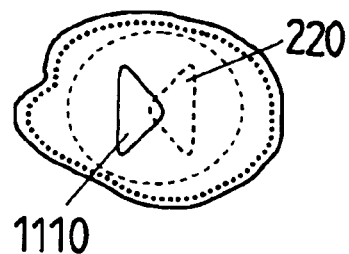
Figure 17F:
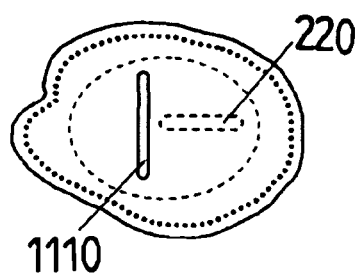
Figure 17G:
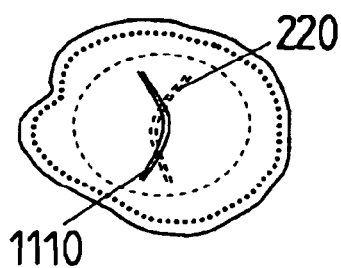
Figure 17H:
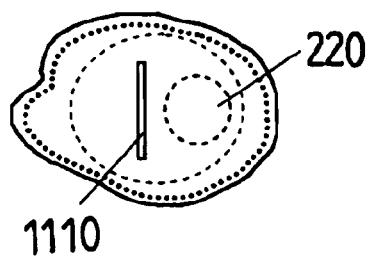
Figure 17K:
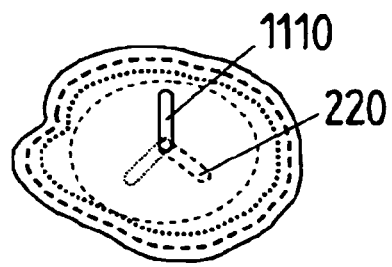
Figure 17I:
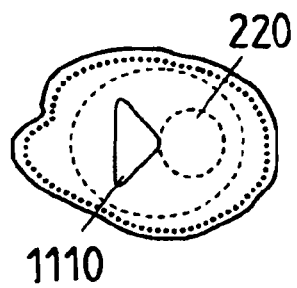

It is also possible, to provide more than two openings, whereby for instance a third or multiple additional layers can be provided additionally to the first and the second airbag layer 11, 2. In each of the layers an opening can be arranged which enables an access to the chamber of the airbag. The openings can overlap each other in a section (as shown in FIG. 17K); this is however not necessarily required.

Figure 17L:
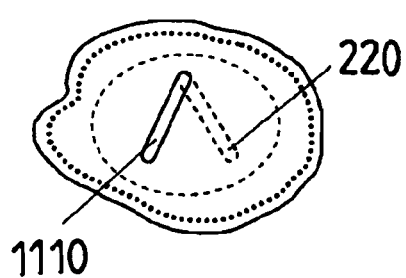
Figure 17J:
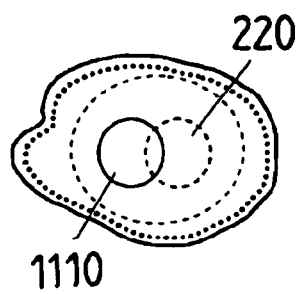
Figure 17M:
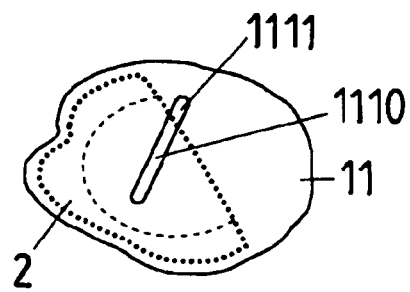

According to a further aspect the second layer 2 does not have any openings, but rather covers only a part of the first opening 1110 (FIG. 17M). The section of the opening 1110 which is not covered by the second layer 2 forms then the pass through opening 1111 to the chamber of the airbag.

Figure 18:
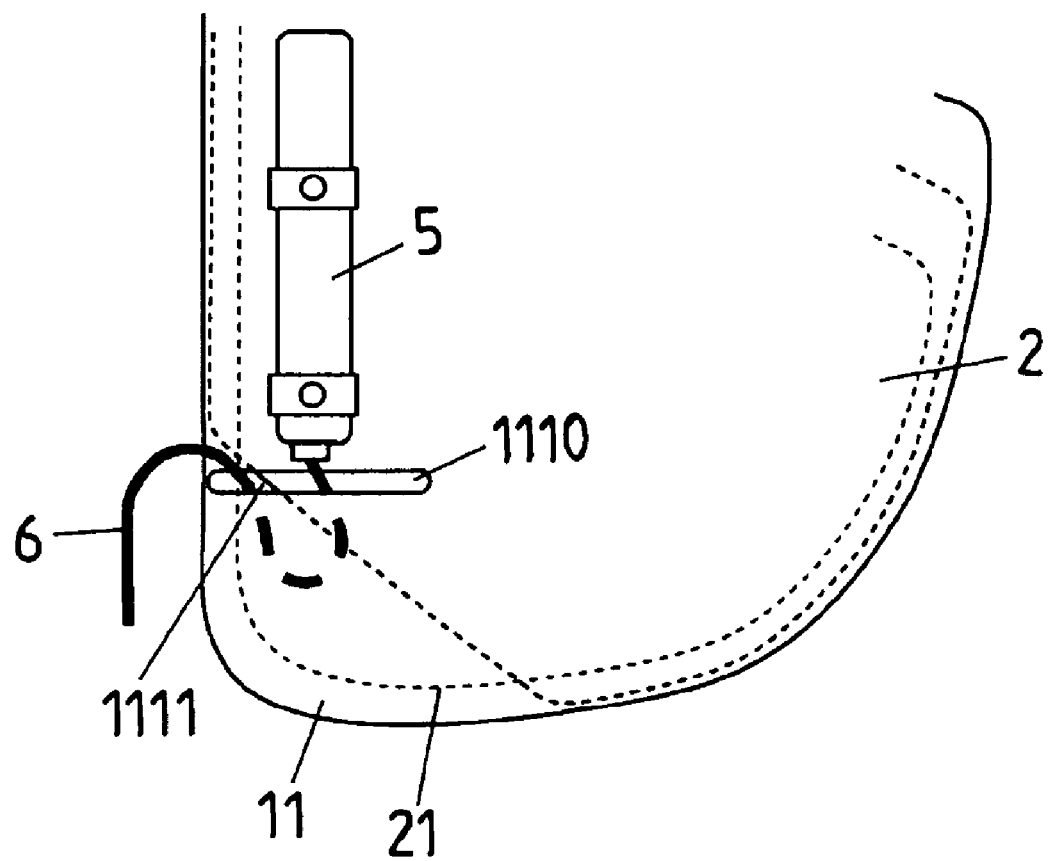
FIG. 18 shows a further embodiment of the airbag arrangement.
Figure 19A:
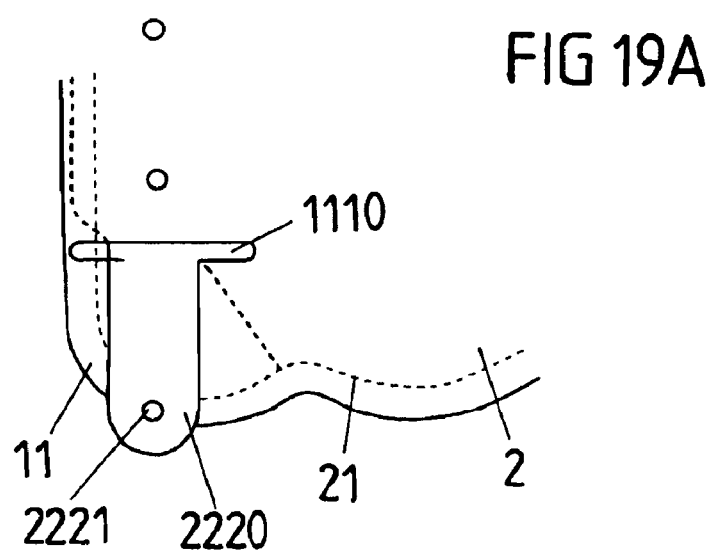
FIG. 19A shows a further embodiment of the airbag arrangement.
Figure 19B:
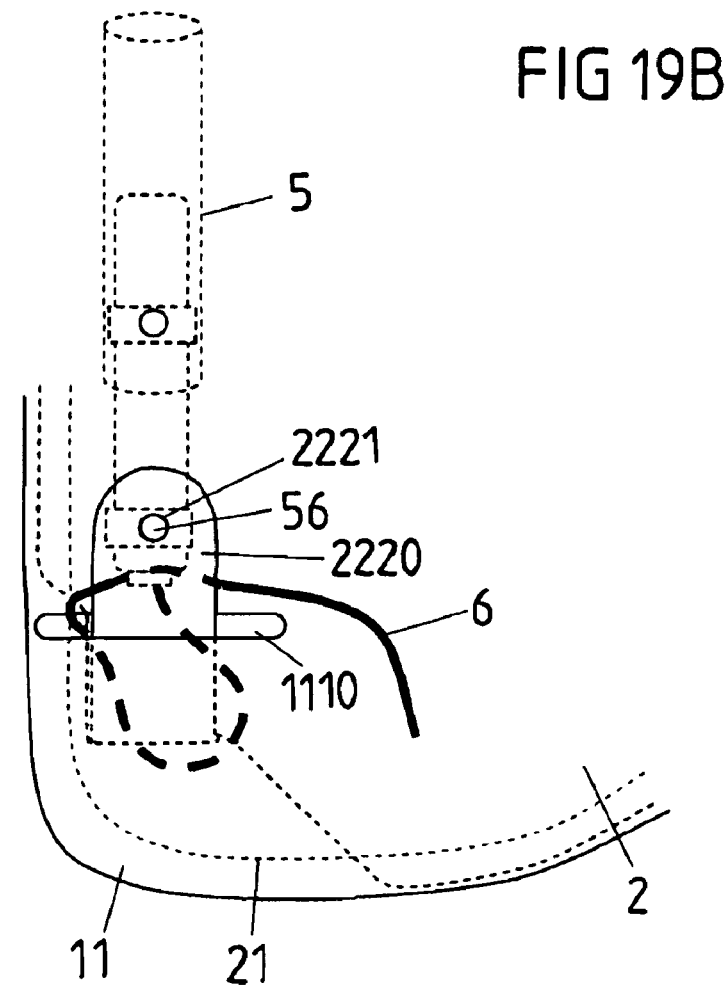
FIG. 19B shows a further embodiment of the airbag arrangement.

The FIGS. 18, 19A and 19B relate to a similar variant. Here, the second (inner) layer 2 covers also only a part of the first opening 1110. The rim of the second layer 2 is designated by a dotted line. The first opening 1110 is arranged such that it is separated by a circumferential seam 21 which connects the airbag layers forming the chamber of the airbag with each other. A section of the first opening 1110 which extends between the circumferential seam 21 and the rim of the second layer 2 form the pass through opening 1111. An ignition cable 6 of the gas generator is guided through the pass through opening 1111.

FIGS. 19A and 19B show a modification of the variant of FIG. 18. Here, the second layer 2 has in the area of the first opening 1110 a flap 2220 which is guided through the (longitudinal) opening 1110 to the outside (FIG. 19A). Subsequently, it can be bent into the direction of the gas generator (not shown in FIG. 19A; compare FIG. 19B) and can be fixed to it whereto a fixing structure (opening 2221) is provided via which the flap can be arranged on a bolt of the gas generator.

In a further variant (FIG. 19B) the flap 2220 is bent into the direction of the gas generator 5 in the chamber of the airbag, and is guided through the opening 1110 with one end to the outside. The end of the flap 2220 guided to the outside is placed over the cable 6 and is fixed to a fastening bolt 56 of the gas generator 5 via the opening 2221 provided at the end, which is guided to the outside.

Figure 20:
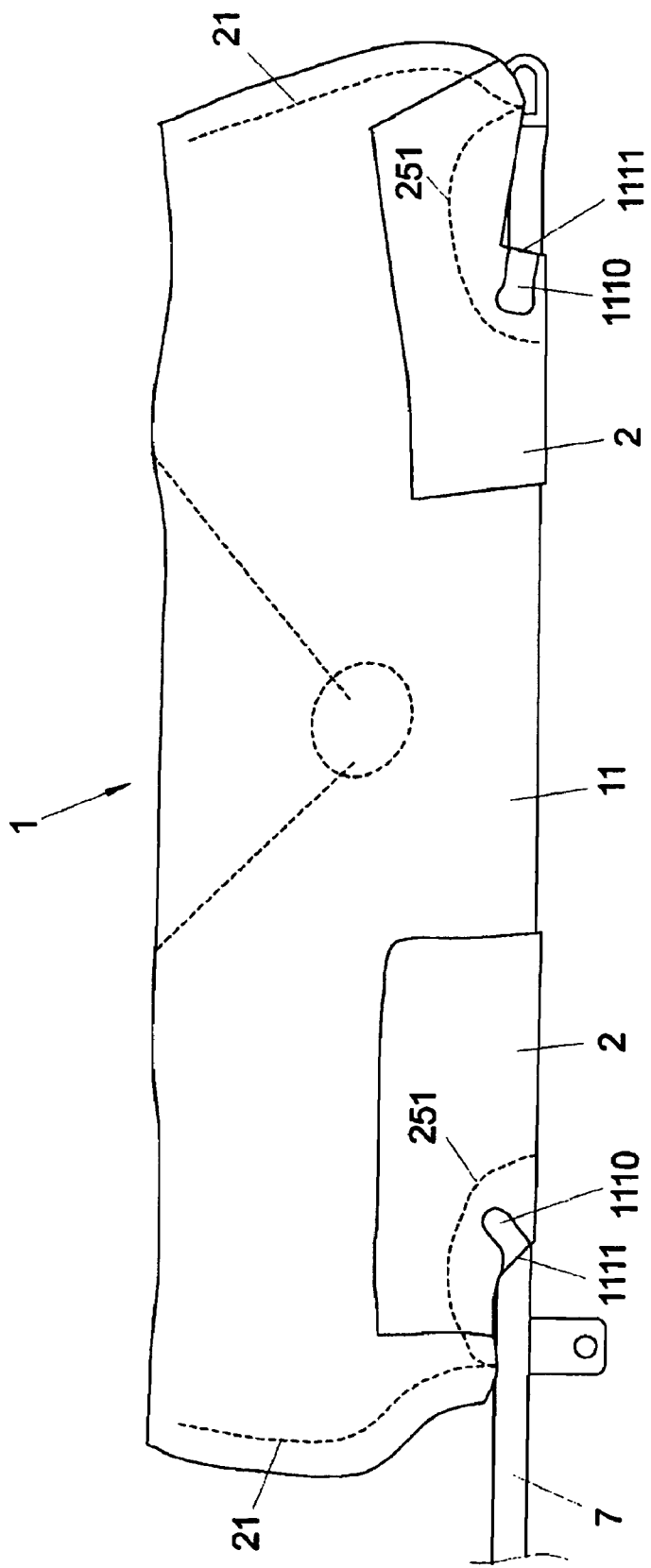
FIG. 20 shows yet a further embodiment of the airbag arrangement.

A further embodiment of the airbag arrangement is shown in FIG. 20. An airbag 1 has two pass through openings 1111, which are in each case formed by the overlapping first and second openings in a first layer 11 and a second layer 2. The first and second openings continue V-shaped (compare FIG. 17L), respectively.

A gas guide sleeve (gas lance) 7 extends through the pass through openings 1111. The gas guide sleeve 7 is for instance part of the head-airbag arrangement.

German Priority Application 20 2007 006 023.8, filed Apr. 19, 2007, including the specification, drawings, claims and abstract, is incorporated herein by reference in its entirety.

What is claimed is:

1. An airbag arrangement for a vehicle occupant restraint system, comprising:
   an airbag that comprises at least one inflatable chamber and at least one first opening;
   a cover that at least partially covers the first opening of the airbag and that comprises at least one second opening, wherein the first opening and the second opening are arranged such that the chamber of the airbag is accessible through the first opening and the second opening, wherein the first opening is designed in a first layer of a first airbag material and the second opening is designed in a second layer of a second airbag material; and
   at least one part which projects into the airbag through the first opening and the second opening such that the first layer and the second layer are restrained by the part projecting into the airbag in an area of the first and second openings such that a section of a rim of the first opening and a section of a rim of the second opening rest closely against the part,
   wherein the first opening has a non-overlapping portion that does not overlap with the second opening and the second opening has a non-overlapping portion that does not overlap with the first opening, and wherein the first opening and the second opening overlap each other at least in sections.

2. The airbag arrangement according to claim 1, wherein the first opening and the second opening are arranged such that gas can flow out of the chamber of the airbag through the first and second openings.

3. The airbag arrangement according to claim 1, wherein the chamber of the airbag is delimited by the first airbag material.

4. The airbag arrangement according to claim 3, wherein the cover is arranged on a side of the first airbag material facing away from the inflatable chamber.

5. The airbag arrangement according to claim 3, wherein the cover is arranged on a side of the first airbag material facing towards the inflatable chamber.

6. The airbag arrangement according to claim 1, wherein the cover is designed of the second airbag material.

7. The airbag arrangement according to claim 1, wherein the first opening and the second opening are arranged such that the chamber of the airbag is accessible from outside of the airbag.

8. The airbag arrangement according to claim 1, wherein the first airbag material and/or the second airbag material is a stretchable material such that the size of the first opening and/or the second opening depend on an internal pressure of the airbag.

9. The airbag arrangement according claim 1, wherein the first opening and the second opening intersect.

10. The airbag arrangement according to claim 1, wherein the airbag has multiple layers and at least one of the first and second openings is formed in at least two of the multiple layers.

11. The airbag arrangement according to claim 1, wherein the cover has multiple layers and the second opening is formed in at least two of the multiple layers.

12. The airbag arrangement according to claim 1, wherein the first airbag material is manufactured separately from a third airbag material that forms a portion of the airbag which is connected to the first airbag material.

13. The airbag arrangement according to claim 1, wherein the part is a gas generator which at least projects in sections into the airbag.

14. The airbag arrangement according to claim 1, wherein the part is a fixing element configured to fix the airbag to a vehicle structure.

15. The airbag arrangement according to claim 1, wherein the part is an electrical wire which is connected to a further part inside of the airbag.

16. The airbag arrangement according to claim 1, wherein a flap adjoins to the first opening or the second opening which is so flexible that the first opening or the second opening can be at least partially released by bending the flap.

17. A method for producing an airbag module using an airbag arrangement according to claim 1 such that the cover is arranged in an inside of the chamber of the airbag, comprising:

passing a first end of a gas generator through the first opening arranged in the first airbag material and through the second opening provided in the cover such that the gas generator takes a first position, such that, in the first position, the first end projects into the chamber of the airbag and is further away from the first opening than from the second opening and a second end of the gas generator opposing the first end is outside of the airbag; and turning the gas generator into a second position in which the first end is closer to the first opening than to the second opening.

18. The method according to claim 17, wherein the turning of the gas generator is carried out at about 180°.

19. The airbag arrangement according to claim 1, wherein the cover is connected to the airbag via a circumferential seam that extends along a complete circumference of the cover.

20. A method for producing an airbag module using an airbag arrangement, the airbag arrangement comprising an airbag that comprises at least one inflatable chamber and at least one first opening; a cover that at least partially covers the first opening of the airbag and that comprises at least one second opening, wherein the first opening and the second opening are arranged such that the chamber of the airbag is accessible through the first opening and the second opening, wherein the first opening is designed in a first layer of a first airbag material and the second opening is designed in a second layer of a second airbag material; and at least one part which projects into the airbag through the first opening and the second opening such that the first layer and the second layer are restrained by the part projecting into the airbag in an area of the first and second openings such that a section of a rim of the first opening and a section of a rim of the second opening rest closely against the part, the cover being arranged in an inside of the chamber of the airbag, comprising:

passing a first end of a gas generator through the first opening arranged in the first airbag material and through the second opening provided in the cover such that the gas generator takes a first position, such that, in the first position, the first end projects into the chamber of the airbag and is further away from the first opening than from the second opening and a second end of the gas generator opposing the first end is outside of the airbag; and turning the gas generator into a second position in which the first end is closer to the first opening than to the second opening.

21. The method according to claim 20, wherein the turning of the gas generator is carried out at about 180°.

* * * * *